United States Patent
Manning

(10) Patent No.: US 9,461,337 B2
(45) Date of Patent: Oct. 4, 2016

(54) SEPARATOR FOR ELECTROCHEMICAL CELL WITH THERMALLY INDUCED SELF-DISCHARGE INTRINSIC IN THE CONSTRUCTION

(71) Applicant: Freya Energy, Inc., Melbourne, FL (US)

(72) Inventor: Andrew James Manning, Randolph, NJ (US)

(73) Assignee: Freya Energy, Inc., Melbourne, FL (US)

( * ) Notice: Subject to any disclaimer, the term of this patent is extended or adjusted under 35 U.S.C. 154(b) by 179 days.

(21) Appl. No.: 14/208,002

(22) Filed: Mar. 13, 2014

(65) Prior Publication Data

US 2014/0272531 A1 Sep. 18, 2014

Related U.S. Application Data

(60) Provisional application No. 61/780,900, filed on Mar. 13, 2013.

(51) Int. Cl.
*H01M 2/16* (2006.01)
*H01M 10/42* (2006.01)

(52) U.S. Cl.
CPC ......... *H01M 10/4235* (2013.01); *H01M 2/162* (2013.01); *H01M 2/1653* (2013.01); *H01M 2/1666* (2013.01); *H01M 2/1686* (2013.01)

(58) Field of Classification Search
CPC ........... H01M 10/4235; H01M 2/162; H01M 2/1653; H01M 2/1666; H01M 2/1686
See application file for complete search history.

(56) References Cited

U.S. PATENT DOCUMENTS

| | | | | |
|---|---|---|---|---|
| 2006/0166085 A1* | 7/2006 | Hennige | ................ | H01B 1/122 429/128 |
| 2011/0183203 A1* | 7/2011 | Du | ......................... | B82Y 30/00 429/217 |
| 2011/0256443 A1* | 10/2011 | Park | ..................... | H01M 2/162 429/145 |
| 2012/0208082 A1* | 8/2012 | Honda | .................... | H01M 4/60 429/210 |
| 2014/0272489 A1* | 9/2014 | Anandan | ............... | H01M 2/348 429/61 |

OTHER PUBLICATIONS

L.F. Xiao, X.P. Ai, Y.L. Cao, Y.D. Wang, and H.X. Yang, "A composite polymer membrane with reversible overcharge protection mechanism for lithium ion batteries", May 24, 2005, Electrochemistry Communications 7 (2005) pp. 589-592.*

* cited by examiner

Primary Examiner — Jonathan Jelsma
(74) Attorney, Agent, or Firm — Michael L. Leetzow, P.A.

(57) ABSTRACT

A separator for a rechargeable electrochemical cell has a conductive first layer and a non-conductive second layer. The non-conductive second layer and the conductive first layer are adhered to one another, wherein the non-conductive second layer has a melting point below a critical temperature for the rechargeable electrochemical cell and discharges the cell when subject to overheating.

14 Claims, 5 Drawing Sheets

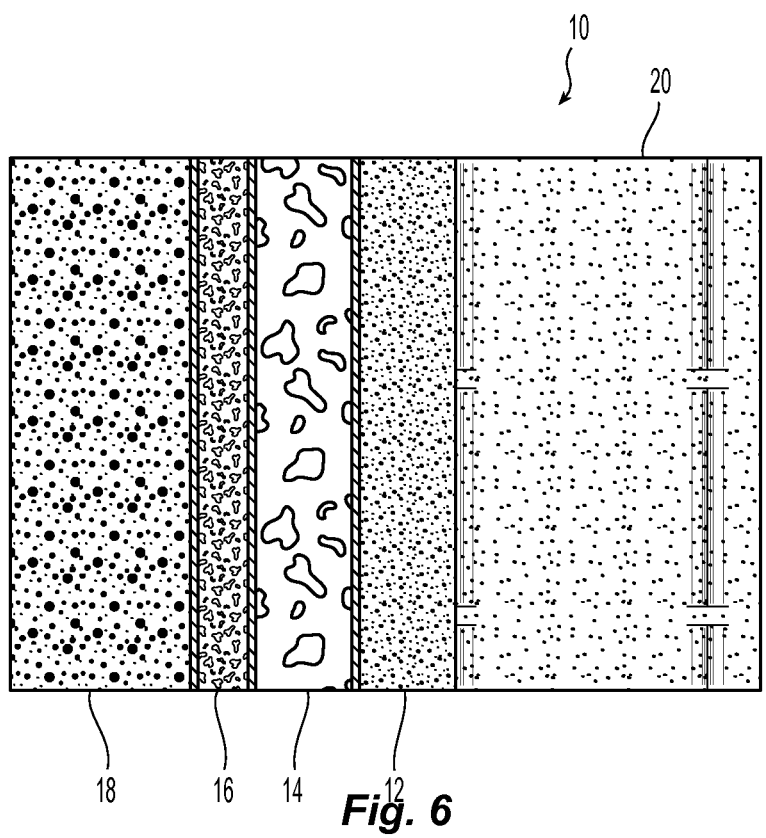

SEPARATOR FOR ELECTROCHEMICAL CELL WITH THERMALLY INDUCED SELF-DISCHARGE INTRINSIC IN THE CONSTRUCTION

REFERENCE TO RELATED CASE

This application claims priority under 35 U.S.C. §119 (e) to provisional application No. 61/780,900, filed on Mar. 13, 2013, which is hereby incorporated by reference in its entirety.

BACKGROUND OF THE INVENTION

Field of the Invention

The present invention relates to a separator for an electrochemical cell and, in particular to a separator that prevents an electrochemical cell from initiating an uncontrolled exothermic reaction when overheated. The invention uses a controlled second layer in the separator that can be thermally activated in combination with the conductive layer of the separator in co-pending application Ser. No. 14/207,984 filed on the same day, the contents of which are hereby incorporated by reference in their entirety. The combination of layers exhibits a very unique reaction to overheating where the electrical energy stored in the cell is siphoned off in a controlled manner, thus reducing the reactivity of the anode and cathode and reducing the possibility of a dangerous reaction.

Advanced batteries, especially high-energy lithium ion batteries, offer the highest specific energy and highest energy density of all commercial batteries today. Lithium ion batteries, simply by their nature of storing large amounts of energy, have the risk of significant incidents, including explosions and fire. It is well known and recognized that lithium ion cells are far more dangerous in the charged state than the discharged state. This is due to numerous reasons: while the carbon anode material itself is very benign, lithiated carbon is reactive and the more lithium contained within the carbon, the more reactive it becomes to the point of being as reactive as lithium metal itself. Charging a cell (especially improperly) can cause formation of lithium dendrites, which will grow though the separator and eventually from internal shorts. The higher voltage potential across the electrochemical cell decreases the stability of the electrolyte-cathode interface. Fully discharged electrochemical cells offer more limited risk, restricted primarily to the flammable nature of the electrolyte. This difference in risk is why lithium ion cells are shipped at 30 to 50% state of charge.

The safety of higher energy lithium ion systems is very dependent on very careful electronic monitoring and control. If they are allowed to transfer too much lithium, or they are allowed to reach critical temperatures due to any one of many causes, or if the internal components of the cell (especially the anode) are exposed to the atmosphere, these electrochemical cells have a great tendency to initiate runaway exothermic reactions that lead to volatile gas generation, venting, fire, and possible explosion.

In order to prevent these occurrences the charging and discharging of lithium ion cells must be controlled by an electronic circuit or computer known as a battery management system (BMS).

While safe under controlled conditions, there are numerous incidents of battery failure, fires ranging from small cell phones, to laptops, to e-bikes, and to even large aircraft batteries. As a result there are very strict regulations on the transport of lithium ion batteries.

Overheating of a lithium ion cell (electrochemical cell) especially one that is fully charged (or overcharged) will result in a cell/battery failure, and almost inevitably ends with venting and fire. The failure occurs because overheating causes the highly lithiated solid electrolyte interface (SEI) layer to decompose. When combined with a fully charged or overcharged anode, the resultant reaction is very violent and energetic. Overheating of a cell can be caused by any number of reasons. If the surrounding environmental temperature reaches 150° C. to 165° C., the electrochemical cell will generally go into a runaway exothermic reaction with venting and fire. Even a discharged cell can be dangerous, although overheating of a fully discharged cell is generally limited to vaporization of the flammable electrolyte.

Excessive charge or discharge rates, without adequate thermal management (cooling) can also result in overheating the electrochemical cell. All batteries have a finite DC resistance which means that current flowing through them will generate heat according to the equation $Q=I^2R$. Thus, charging or discharging at high rates can cause excessive heating, leading to a runaway reaction.

An external short circuit, which causes an excessive discharge rate, may also result in a runaway reaction.

Charging an electrochemical cell generally causes an increase in temperature, simply due to resistive heating. Overcharging continues to increase the temperature of the cell, while causing a reduction in stability of the cathode and the SEI layer, eventually resulting in a runaway reaction.

Lithium ion cells have low internal resistance, and therefore can discharge very high currents. However, even with a low internal resistance, a high current (without adequate thermal management) can cause the electrochemical cell to overheat, resulting in an over temperature situation and runaway reaction.

Mechanical damage can take various forms, but most of them involve puncturing of the separator and creating an internal short circuit. Mechanical damage is generally portrayed by a test called nail penetration, where a nail is driven through the electrochemical cell to cause a direct short between the electrodes. Direct shorts result in the discharge of the cell's energy through the short, thus causing localized excessive heating, which leads to a runaway reaction.

Internal short circuits can also have various causes. Internal short circuits are effectively the same as mechanical damage, where a localized area is subjected to localized overheating which leads to a runaway reaction.

"Shut down" separators are well known. They are generally based upon a trilayer construction of polyethylene (PE) between two layers of polypropylene (PP). Since the PE melts at a lower temperature, the PP remains in tact and the PE melts and closes the pores of the separator preventing any further ionic transport. The problem with shut down separators of this type is that they generally leave the electrochemical cell in a very dangerous condition. Since the electrochemical cell is often fully charged or overcharged when the overheating occurs and the separator no longer transports ions, there is no way to discharge that electrochemical cell. Anything done to dispose of the cell, such as puncturing it, will result in a fire.

Shut down separators also do not function effectively in the case of mechanical damage or any kind of short. The separator in the vicinity of the short closes the pores around the short, resulting in the current flow being concentrated on the element causing the short.

The present invention has a separator with a conductive layer and a layer that melts, but the melting layer is of such volume as to not blind the pores in the separator or the electrodes. The melting of the non-conductive layer allows the conductive layer (with large area and controlled resistance) to make contact between the electrodes and gradually siphon off the energy. This design prevents an electrochemical cell from having a uncontrolled reaction in response to overheating, and it safely discharges the electrochemical cell.

SUMMARY OF THE INVENTION

The present invention is directed to a separator for use in a rechargeable electrochemical cell to prevent an uncontrolled reaction in the rechargeable electrochemical cell upon overheating that includes a conductive first layer, and a non-conductive second layer, the non-conductive second layer and the conductive first layer are adhered to one another, wherein the non-conductive second layer has a melting point below a critical temperature for the rechargeable electrochemical cell.

In some embodiments, the non-conductive second layer of the separator melts between about 100 and 150° C. and more preferably between about 125 and about 130° C.

In some embodiments, the first layer includes an electrically conductive polymer and melting of the non-conductive second layer allows the separator to become conductive thereby discharging the rechargeable electrochemical cell.

In some embodiments, the separator includes an adhesive, wherein the adhesive has an adhesion temperature below a first temperature and the second layer includes a resin having a melting temperature, and the first temperature being lower than the melting temperature of the resin.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 6 is a schematic view of one embodiment of a two-layer separator in an electrochemical cell according to the present invention;
FIG. 7 is a graph showing the response of an electrochemical cell to overheating that has a separator according to the present invention.

DETAILED DESCRIPTION OF THE PREFERRED EMBODIMENTS

Figure 1:
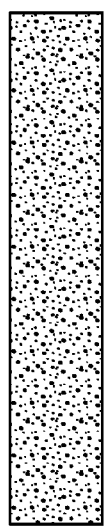
FIG. 1 is a schematic view of a prior art separator.

Reference will now be made in detail to the present preferred embodiment(s) of the invention, examples of which are illustrated in the accompanying drawings. Whenever possible, the same reference numerals will be used throughout the drawings to refer to the same or like parts.

A prior art separator is illustrated in FIG. 1. The prior art separator, as alluded to above, is generally comprised of a non-conductive microporous polymer film. The film is most commonly a polyolefin. It is desirable to have a film that melts at a temperature greater than 130° C. to prevent shorting of the electrodes on overheating. As charging and discharging cause heating of the cell, it is also desirable to stop the charging or discharging before the temperature reaches a value to cause a runaway reaction. This prevention is often done by including a lower melting point polymer in the separator that melts and blinds the pores at a predetermined temperature. In all cases the separator is intended to electrically insulate the anode and cathode. This design insures that the cell does not self-discharge or "leak-down" the contained energy.

In other prior art, a separator is comprised of a micro porous conductive polymer such as PI which becomes conducting at 3.5 to 3.8 volt potential across the film. This approach has not worked because the voltage is too low for an electrochemical cell such as a high energy lithium battery. The approach prevents the battery from fully charging. Therefore, it is necessary to have a separator that supports the necessary voltage so as not to not limit the charging of the cell or discharge the electrochemical cell prematurely.

Figure 2:
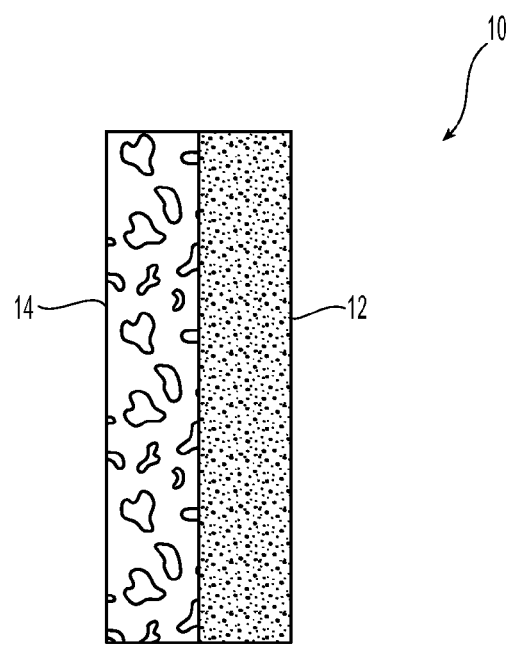
FIG. 2 is a schematic view of one embodiment of a two-layer separator according to the present invention.

As schematically illustrated in FIG. 2, a separator 10 also has a first layer of a micro-porous conductive polymer 12. The separator 10 also has a second layer 14 of one or more essentially non-conductive polymers. The selection of the polymers that may be used in the second layer 14 is the basis of this invention in that one of the polymers has a melting point (or softening point) that allows the anode to contact the conductive layer 12 of the separator 10 at a specified temperature (normally between about 125° C.-130° C.). Such polymers include as polyvinylidene fluoride (PVDF), Torlon® polyamide-imide (PAI), and polyolfinic derivatives. For reasons that will become evident later, one of the preferred materials is either a chlorinated polypropylene or polypropylene-maleic anhydride copolymer. The key properties of the second layer 14 are that the material be non-conductive, have sufficient adhesion to the first layer and be able to be made micro porous. Either layer or the composite may also optionally contain a non-woven scrim or web to provide added strength or puncture resistance to the separator 10.

Figure 3:
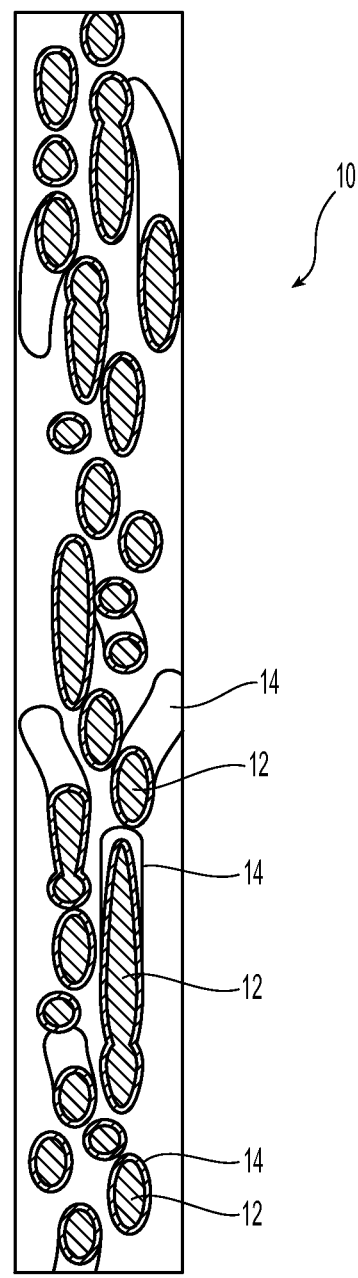
FIG. 3 is a partial cross sectional view of a representation of a two-layer separator according to the present invention.

While FIG. 2 illustrates two layers in a schematic way, the first layer 12 may be a fibrous web of a micro-porous conductive polymer(s) that is then coated in the second layer 14 of one or more essentially non-conductive polymers. See, e.g., FIG. 3.

It is essential to the invention that the separator be microporous. There are several ways to ensure that the separator 10 is microporous. The layers 12,14 of the separator 10 can be made micro porous by the addition of a pore former (such as tetrabutylammoniumbromide (TBAB), soluble waxes, dibutylphthlate (DBP) or other known pore formers, which are extracted after the formation of the layers 12,14 or the separator 10. Most pore formers have to be removed by washing with water or extracting with solvent followed by drying. Further, most pore formers have an adverse effect on the performance of a lithium/lithium ion cell if they are not completely removed. The use of ethylene carbonate (EC) as a pore former is unique and offers substantial benefits. First, it is a solid at room temperature (the melting point is about 40° C.) so it precipitates out as the layers 12,14 of the separator 10 cools to form a dispersed solid rather than evaporating with the solvent. The dispersed solids sublime (evaporate) and the sequential nature of the process creates the micro-porosity without the need for washing or extracting. Secondly, EC is an electrolyte solvent, and residual EC has no detrimental effects on the cell.

Another way the layers 12,14 or the separator 10 may be made porous, without using a pore former, is to incorporate a second polymer that is incompatible with the conductive polymers in the layers 12,14. As described in more detail below, a coating is made by using a solvent system that will dissolve two polymers, especially at elevated temperatures. This coating can be processed two different ways. It can form an interpenetrating polymer network, or one resin can be preferentially phased out first during drying by controlling the solvency of the solvent system.

A third method of creating micro pores is to create the conductive polymer as a web or non-woven scrim for the first layer 12, and the second layer 14 can be applied directly.

In assembling the separator 10, the two layers 12,14 need to be adhered to one another. While they may be placed adjacent to one another if they are two separate layers, they must adhere to one another if one layer is applied to the second layer. Otherwise, there may be a breakdown in the function of the separator 10. However, when adhering one layer to the other, care must be taken not to blind the micropores that have been created. The solution is relatively simple if a pore former, as discussed above, is used. Care must be taken to ensure that the pore former is not extracted until both layers 12,14 are constructed to form the separator 10. In this way, the pore former acts as a place-holder for the micro-pores and the micro-pores are present after the pore former is removed (e.g., sublimation, washing, etc.)

Another way to ensure the micro-porosity of the separator 10 is to use resins and solvents (discussed in more detail below) such that the polymers in the layer have a poor cohesive strength, thereby forming micropores in the layer.

Figure 4:
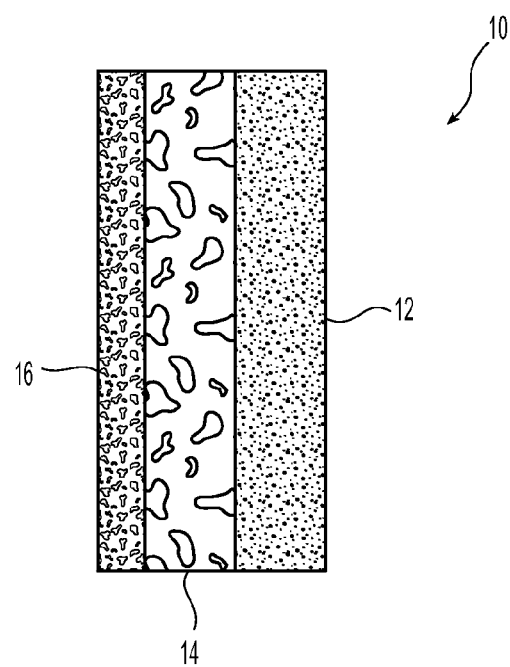
FIG. 4 is a schematic view of a two-layer separator with an adhesive layer.

As noted above, if the separator 10 is made of two separate layers, then the two layers could be placed adjacent to one another. Additionally, they could be adhered to one another using an adhesive 16. A schematic of this configuration is illustrated in FIG. 4. However, in one embodiment of the present invention, the adhesive 16 is incorporated into the second layer 14. The adhesive 16 is a resin that can be dispersed with the layer 14 in one of two ways. First, there are two resins in solution and they can be made to sequentially precipitate out upon drying under known conditions to form an interpenetrating network or where one of the resin is dispersed within the other. The microporosity is caused by choosing resins for the solution for layer 14 that are not totally compatible in solution, so that when the first resin precipitates out, the second resin forms around the first resin and the interfacial boundary creates the void and the path for the electrolyte in the electrochemical cell.

The adhesive 16 is comprised of micro-particles distributed throughout the non-conductive second layer, preventing the adhesive from blinding the micro pores in the second layer 14 (and the first layer 12 as well) as would occur with an adhesive film.

Figure 5:
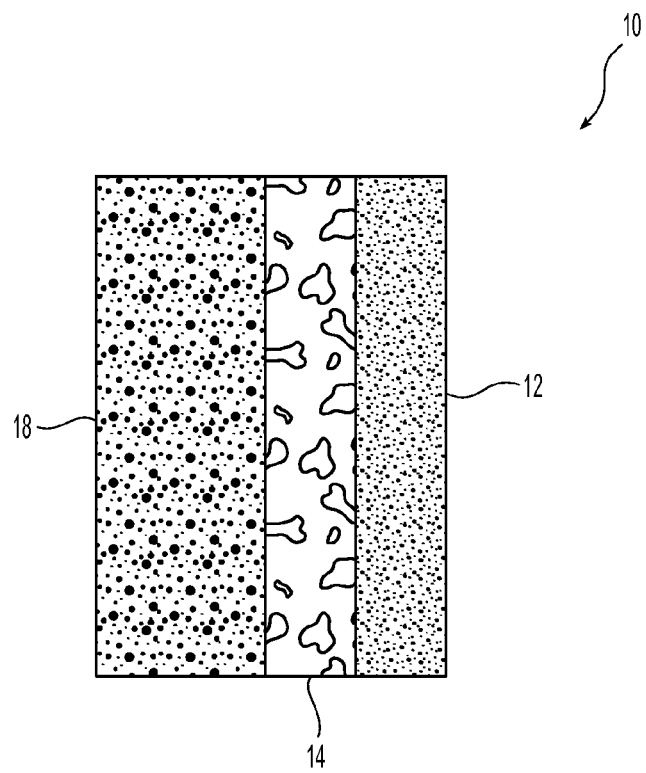
FIG. 5 is a schematic view of one embodiment of a two-layer separator laminated to an anode according to the present invention.

The separator 10 can then be laminated to an anode 18 of the electrochemical cell as illustrated in FIG. 5 using the adhesive 16 in layer 14. In fully lithiated or over-lithiated electrochemical cells, the amount of lithium contained within the anode is sufficient to make it potentially dangerous. Fully lithiated anodes will burst into flame if exposed to moist air. Over-lithiated anodes are even more dangerous as they may have lithium dendrites (comprised of finely divided lithium metal). Laminating the separator 10 to the anode 18 provides a migration barrier for the moisture in the air, thus slowing down the reaction and preventing a runaway exothermic reaction that results in fire.

Alternatively, as explained in more detail below in the examples, rather than preparing the layers 12,14 on a glass plate or other substrate, the layers 12,14 could be prepared on an anode, which will adhere the layers 12,14 to the anode 18. As will be recognized by one of skill in the art, multiple anodes could be made in this way at one time.

Once the separator 10 is adhered to the anode 18, a cathode 20 is added to the structure as illustrated in FIG. 6. The cathode 20 can be physically held against the separator 10 as is done in conventional lithium ion cells, or a second adhesive layer can be applied on the cathode side of the separator 10, or a bonding resin can be added to the first layer 12 as was done in the second layer 14 and laminated to the cathode 20.

Turning now to specific examples of the separator 10 described above, a first example is provided. In this example, the second layer 14 is made before the first layer 12.

Example 1

A coating solution is made of the following formulation:

| Non conductive layer Formulation | Percentages (from about to about) |
|---|---|
| Specific melting/Softening Point (~125° C. to 135° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The molecular weight of the chlorinated polypropylene is chosen to give a melt or softening temperature of greater than 125° C.-130° C. The second resin can be chlorinated polypropylene or polypropylene-maleic anhydride co-polymer with a melting point of 85° C. The coating solution is maintained at about 80° C., and cast on a glass plate (at room temperature) using a 6 mil drawdown bar. A piece of Porous Power's PVDF coated non-woven is laid into the wet coating on the glass plate and rolled in to completely saturate and embed it in the first solution. The material is allowed to flash-dry to the point where the surface is no longer glossy and can be touched.

At this point a second coating (the first layer 12) of the following formulation is applied:

| Conductive layer Formulation | Percentages (from about to about) |
|---|---|
| High Temperature Chlorinated Polypropylene 26% Cl | 0-5 |
| Polyetherimide or other conductive polymer | 5-15 |
| Fumed silica or other ceramic filler | 0-3 |
| Solvent 1 - tetrachloroethylene or other | 20-50 |
| Solvent 2 - n-methyl-pyrrolidone or other | 30-85 |
| Pore former - EC or other | 0-10 |
| Total | 100 |

The coating is maintained at about 90° C. and is drawn down over the first coating using a six mil draw down bar. The separator 10 is allowed to air dry for 4 hours and then soaked in distilled water until the film floats off the glass. The layers 12,14 are then dried at ambient temperature in a vacuum oven overnight. During the drying in the vacuum oven, the pore former (EC or equivalent) sublimates leaving the micropores in the separator 10.

The separator 10 will be white when it dries—indicating the microporous nature. The separator 10 is then laminated to the anode 18 using a cold roll laminator with a preheat zone set at 85° C. It should be noted that the melting point of the chlorinated polypropylene or polypropylene-maleic anhydride co-polymer is at the temperature of the laminator, making the chlorinated polypropylene or polypropylene-maleic anhydride co-polymer the adhesive 16 in this example. Since the second layer 14 was made first, the side in contact with the glass must face the anode 18.

An electrochemical cell is then built using the anode 18 with laminated separator and a matched cathode 20.

Example 2

A 16 micron non-woven web comprised of fibers of a conductive polymer, acting as the conductive first layer 12, is saturated and coated with the following formulation:

| Non conductive layer Formulation | Percentages (from about to about) |
|---|---|
| Specific melting/Softening Point (~125° C. to 135° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The resultant re-enforced film is washed, if necessary, air dried, and then dried at ambient temperature in a vacuum oven overnight. The washing may be necessary depending on the pore former. In this example EC is specifically illustrated and, as noted above, sublimates. The separator 10 will be white when it dries—indicating the microporous nature. The separator 10 is then laminated to an anode 18 using a cold roll laminator with a preheat zone set at 85° C. for the reasons noted above.

Example 3

The 16 micron non-woven web comprised of fibers of a conductive polymer from Example 2 is saturated and coated with the following formulation:

| Non conductive layer Formulation | Percentages (from about to about) |
|---|---|
| Specific melting/Softening Point (~125° C. to 135° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The wet saturated separator 10 is then laid directly on an individual anode 18 or a length of anode material out of which are cut individual anodes, as noted above. In this example, it is particularly valuable to use EC or another pore former that does not require washing. The anode/separator 18,10 composite is then air dried and then vacuum dried at temperatures up to about 60° C. until the solvent and the pore former are removed.

Referring now to FIG. 7, an electrochemical cell with the inventive separator is subjected to a continually increasing temperature by external heating. The temperature line shows the electrochemical cell's temperature. The voltage line shows the voltage behavior of an electrochemical cell containing the separator. At about 125° C., the separator becomes conductive and begins to discharge the voltage in the electrochemical cell. The discharge is not instantaneous, but shows a controlled rate avoiding violent reaction. The rate of self-discharge can vary from minutes to as much as 24 hours based upon the electrochemical cell construction and test variables. By contrast, when the temperature of an electrochemical cell with a commercial non-thermal protection separator reaches the melt point of the separator, the cell shorts, vents and immediately falls to 0 volts (the second voltage line). It should be noted that the temperature indicated is the temperature between the thermal stage and the cell (dominated by the stage) and not the top surface cell temperature—which immediately reaches 300° C. to 500° C. when the electrochemical cell with the conventional separator vents and bursts into flame.

Figure 8:
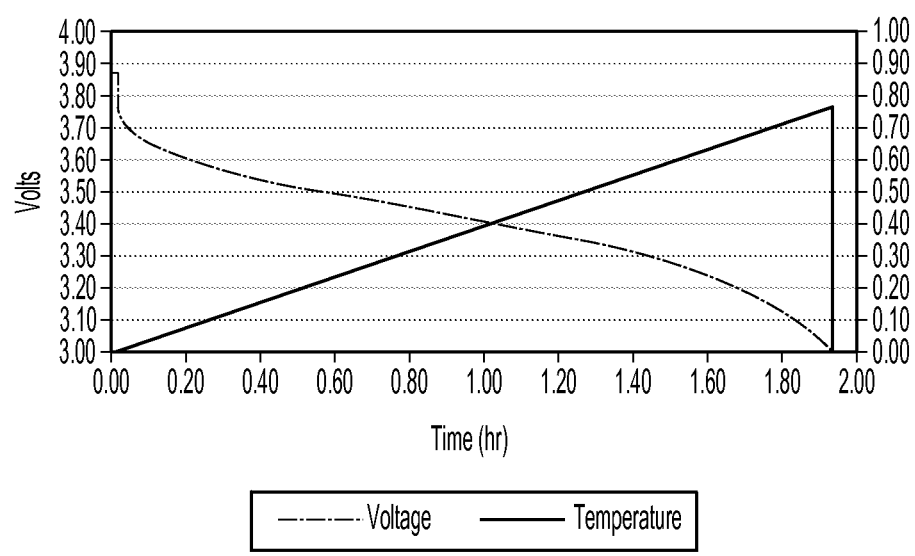
FIG. 8 is a graph showing the response of an electrochemical cell to a nail test that has a separator according to the present invention.

FIG. 8 shows the results of the nail test. The electrochemical cell with the thermal protection safety separator was fully charged and restrained (clamped against expansion, but not tightly). The restraining plates contained a ½" hole in both sides. A number 10 nail was pressed though the electrochemical cell protruding past the opposite side. The electrochemical cell voltage fluctuated for several minutes between 4.0 and 3.65V (the voltage threshold of the conductive layer). The voltage then stabilized at 4.0V. There was no flame and no smoke noted. The nail was removed and there was an open hole about 3/16" in diameter completely though the electrochemical cell. The electrochemical cell was allowed to stand 24 hours and then connected to an Arbin tester and discharged at C/5. The discharge was 0.75 Ah—24 hours after the nail penetration test as seen in FIG. 8. It is hypothesized that the heat from the short caused local melting of the separator effectively sealing off the current collectors and the exposed edge of the cell.

In another example, 2.8 Ah prismatic cells subjected to a nail penetration test where the nail is left in, showed no reaction. The nail penetrates and there is again an immediate drop in voltage to 3.7V and some fluctuation; however, the electrochemical cell then stabilizes and the electrochemical cell continues to discharge slowly over 3 to 5 hours with no fire or smoke.

The safety separator appears to isolate the puncture. The mechanism can be hypothesized, but the net result is that cells containing the safety separator pass the nail penetration test exhibiting an improvement in safety, which is novel, unique and here-to-fore never obtained. It can therefore also be extrapolated that if the cell can withstand a gross short from a nail penetration, it should also provide protection against internal shorts. This is very difficult to prove, but all efforts to simulate an internal short have resulted in the same gradual discharge of the cell.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A separator for use in a rechargeable electrochemical cell to prevent an uncontrolled reaction in the rechargeable electrochemical cell upon overheating comprising:
   an electrically conductive first layer; and
   an electrically non-conductive second layer, the electrically non-conductive second layer and the electrically conductive first layer are adhered to one another, wherein the non-conductive second layer has a melting point below a critical temperature for the rechargeable electrochemical cell wherein the first layer includes an electrically conductive polymer and melting of the electrically non-conductive second layer allows the separator to become electrically conductive thereby discharging the rechargeable cell.

2. The separator according to claim 1, wherein the electrically non-conductive second layer of the separator melts between about 100° C. and about 150° C.

3. The separator according to claim 2, wherein the electrically non-conductive second layer of the separator melts between about 125 and about 130° C.

4. The separator according to claim 1, wherein the electrically conductive first layer includes a fibrous polymer web.

5. The separator according to claim 1, further comprising an adhesive incorporated into the non-conductive second layer.

6. The separator according to claim 5, wherein the adhesive comprises micro-particles distributed throughout the electrically non-conductive second layer.

7. The separator according to claim 1, further comprising an adhesive, wherein the adhesive has an adhesion temperature below a first temperature and the second layer includes a resin having a melting temperature, and the first temperature being lower than the melting temperature of the resin.

8. The separator according to claim 1, wherein the separator is laminated to an anode of the rechargeable electrochemical cell.

9. The separator according to claim 1, wherein the electrically non-conductive second layer includes polymers selected from the group consisting of chlorinated polypropylene, polypropylene-maleic anhydride copolymer, polyvinylideneflouride, and polyvinylideneflouride copolymers.

10. A rechargeable electrochemical cell containing the separator of claim 1.

11. A separator for use in a rechargeable electrochemical cell to prevent an uncontrolled reaction in the rechargeable electrochemical cell upon overheating comprising:
   an electrically conductive first layer; and
   an electrically non-conductive second layer, the electrically non-conductive second layer and the electrically conductive first layer are adhered to one another, wherein the non-conductive second layer has a melting point below a critical temperature for the rechargeable electrochemical cell,
   wherein melting of the electrically non-conductive second layer allows the separator to become electrically conductive thereby discharging the rechargeable electrochemical cell.

12. The rechargeable electrochemical cell according to claim 11, wherein the separator melts at a predetermined temperature and the rechargeable electrochemical cell discharges over a predetermined time period after the separator melts.

13. The rechargeable electrochemical cell according to claim 12, wherein the predetermined time period lasts at least several minutes.

14. The rechargeable electrochemical cell according to claim 12, wherein the predetermined time period lasts no more than 24 hours.

* * * * *